US006820364B1

(12) United States Patent
Tyson

(10) Patent No.: US 6,820,364 B1
(45) Date of Patent: Nov. 23, 2004

(54) LIGHTED BAIT CONTAINER APPARATUS

(76) Inventor: Jeremy D. Tyson, 274 N. Sportsman Rd., Loganton, PA (US) 17747

( * ) Notice: Subject to any disclaimer, the term of this patent is extended or adjusted under 35 U.S.C. 154(b) by 0 days.

(21) Appl. No.: 10/629,193

(22) Filed: Jul. 29, 2003

(51) Int. Cl.$^7$ .............................................. A01K 97/04
(52) U.S. Cl. ............................ 43/17.5; 43/56; 362/109; 220/735
(58) Field of Search ............................... 43/17.5, 54.1, 43/55, 56; 362/119, 190, 206, 184; 220/735, 736; A01K 97/04

(56) References Cited

U.S. PATENT DOCUMENTS

| | | | | |
|---|---|---|---|---|
| 1,556,127 A | * | 10/1925 | Pruett | 224/241 |
| 3,603,019 A | * | 9/1971 | Smeltzer | 43/21.2 |
| 3,667,708 A | * | 6/1972 | Smeltzer | 248/512 |
| 3,938,132 A | | 2/1976 | Cunningham | |
| 4,462,180 A | | 7/1984 | Scott | |
| 4,925,026 A | * | 5/1990 | McKay | 206/373 |
| 5,333,408 A | | 8/1994 | Simmons | |
| 5,412,545 A | * | 5/1995 | Rising | 362/105 |
| 5,685,421 A | | 11/1997 | Gilmore | |
| 5,795,055 A | | 8/1998 | Shiao | |
| 6,000,811 A | * | 12/1999 | Bordak | 362/158 |
| 6,053,315 A | | 4/2000 | Yao | |
| 6,267,240 B1 | | 7/2001 | Callaway | |
| 6,408,561 B1 | * | 6/2002 | Winter | 43/17.5 |
| 6,623,140 B2 | * | 9/2003 | Watterson et al. | 362/184 |

FOREIGN PATENT DOCUMENTS

GB        2154843 A  *  9/1985  .......... A01K/97/04

* cited by examiner

Primary Examiner—Michael J. Carone
Assistant Examiner—Susan C. Alimenti
(74) Attorney, Agent, or Firm—Dale J. Ream

(57) ABSTRACT

A lighted bait container apparatus includes a container defining an open top capable of receiving and holding fishing bait. The container includes a rim body extending about the open top with a pivotal lid and a clamp member coupled thereto. A latch assembly and springs cooperate so that a user may open and close the lid with one hand. The lighted bait container apparatus includes a flashlight having first and second ends and defining an interior space. A first light is positioned at the first end and a second light is positioned at the second end. The flashlight has switches for independently energizing the lights. The clamp member is configured to releasably hold the flashlight. Therefore, the first light enables a user to view the open top and lid while catching or manipulating fish bait at night while the second light provides greater illumination of a ground surface.

17 Claims, 4 Drawing Sheets

LIGHTED BAIT CONTAINER APPARATUS

BACKGROUND OF THE INVENTION

This invention relates generally to lighted storage and carrying containers and, more particularly, to a lighted bait container apparatus having a removable flashlight and convenient operation for catching bait or baiting a hook at night.

Catching bait such as worms at night for the purpose of fishing typically involves holding a flashlight, holding a bait bucket or container, and catching the bait and putting it in the bucket. The fisherman often finds himself with too few hands to accomplish this task conveniently.

Various devices have been proposed in the art for illuminating toolboxes, tackle boxes, and the like. However, the existing devices do not approach a solution to the difficulty raised by collecting worms at night or the difficulty of baiting a hook at night. Namely, the existing devices do not provide a container that includes appropriate lighting options or one-handed operation of the bait collecting/storage container.

Therefore, it is desirable to have a lighted bait container apparatus which includes a bait storage container capable of holding bait as well as a removable flashlight that can be attached to the container for selectively illuminating the container opening while catching bait or baiting a hook.

SUMMARY OF THE INVENTION

A lighted bait container apparatus according to the present invention includes a container having a closed bottom with a continuous side wall extending upwardly therefrom and defining an upper edge. A rim assembly having a rim body is coupled to the upper edge of the side wall with a clamp member attached to one exterior side of the rim body. A lid is pivotally coupled to the rim body for movement between open and closed configurations. A user is able to control this movement with a spring-biased latch assembly coupled to the rim body. The lighted bait container apparatus includes a flashlight having a first light source at a first end and a second light source at a second end. The clamp member is configured to receive and hold the flashlight in a friction or snap-fit relationship such that the flashlight is selectably removable therefrom. The flashlight may be positioned in the clamp member such that the first light source illuminates the open top of the container when energized. The second light source is adjustable between wide or narrow beam patterns and is useful in illuminating the ground where bait is being collected. The light sources may be activated independently. Therefore, this apparatus enables a user to collect bait with one-handed operation of the container and without having to independently hold or position a flashlight.

Therefore, a general object of this invention is to provide a lighted bait container apparatus which enables a user to collect fishing bait and to bait a hook in the dark with convenience.

Another object of this invention is to provide a lighted bait container apparatus, as aforesaid, which includes a bait container with a lid that may be opened and closed with one-handed user operation.

Still another object of this invention is to provide a lighted bait container apparatus, as aforesaid, which illuminates an open top of the bait container and eliminates a user from having to independently hold a flashlight.

A further object of this invention is to provide a lighted bait container apparatus, as aforesaid, which includes a flashlight having a light source at opposing ends for illuminating both the bait container and a ground surface.

A still further object of this invention is to provide a lighted bait container apparatus, as aforesaid, having a rim assembly that is removable from the bait container such that additional bait containers may be filled for later use.

Still another object of this invention is to provide a lighted bait containing apparatus, as aforesaid, in which lid and latch assemblies are spring-loaded to facilitate single-handed use.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 1:
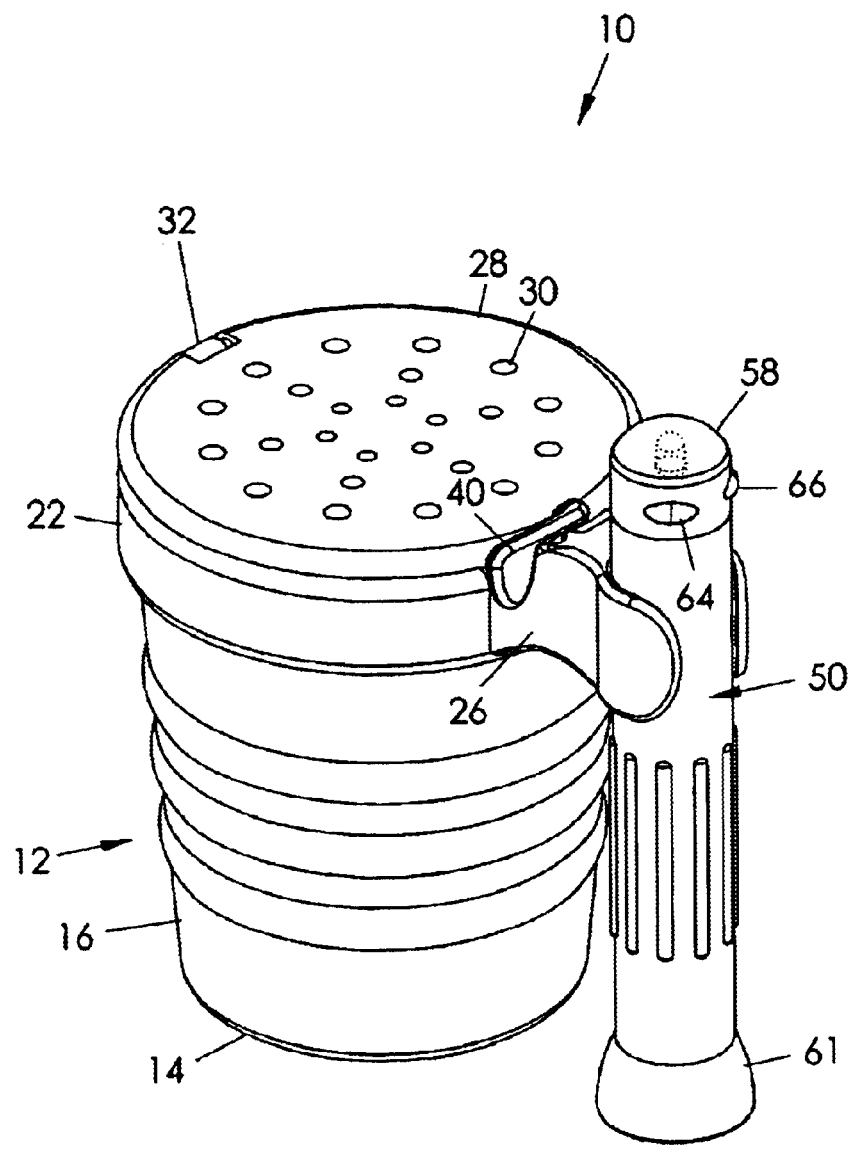
FIG. 1 is a perspective view of a lighted bait container apparatus according to a preferred embodiment of the present invention.

A lighted bait container apparatus 10 according to the now preferred embodiment of the present invention will now be described in detail with reference to FIGS. 1 through 4 of the accompanying drawings. The apparatus 10 includes a bait container 12 having a closed bottom 14 (FIG. 4) with a continuous side wall 16 extending upwardly therefrom. The side wall 16 terminates at an upper edge 18 that defines an open top (FIG. 2). While a bait container 12 having a cylindrical configuration in the general form of a cup is preferred, containers having a rectangular or other configuration would also be suitable. Further, the container 12 may be economically constructed of a durable plastic material that may be transparent although lightweight metal or other suitable materials may be used.

Figure 4:
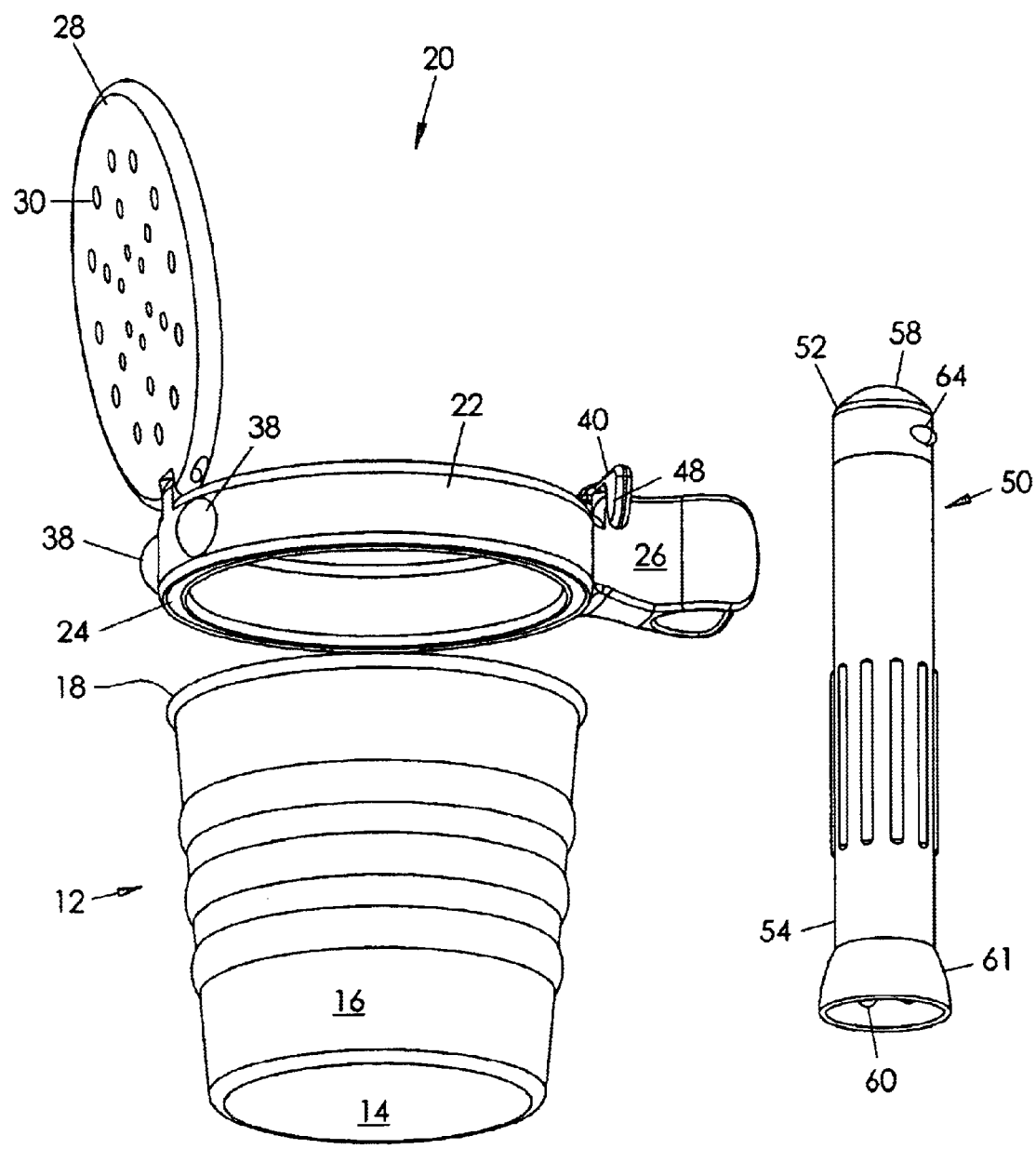
FIG. 4 is another perspective view of the apparatus as in FIG. 2 taken from a lower angle.

The lighted bait container apparatus 10 includes a rim assembly 20 (FIG. 2). The rim assembly 20 includes a rim body 22 with a bottom side thereof defining a groove 24 extending diametrically thereabout (FIG. 4). Therefore, the rim body 22 may be removably coupled to an upper edge 18 of the bait container 12. For example, the rim body 22 may be is removed from a container when it is desired to replace a full container with an empty one. Or, a conventional bait container may be received and held in the bait container 12 or removed therefrom when desired. Of course, a threaded or snap-on lid or a lid with clamps would also work but would not have the benefit of one-handed operation.

The rim assembly includes a clamp member 26 fixedly attached to one side of the rim body 22 and includes a pair of arms having opposed generally concave configurations for releasably holding a flashlight in a friction or snap fit relationship therebetween, as to be described in greater detail below. Other mechanisms for holding a flashlight may be utilized as well, such as a clips, slider structures, or even magnetic structures.

Figure 2:
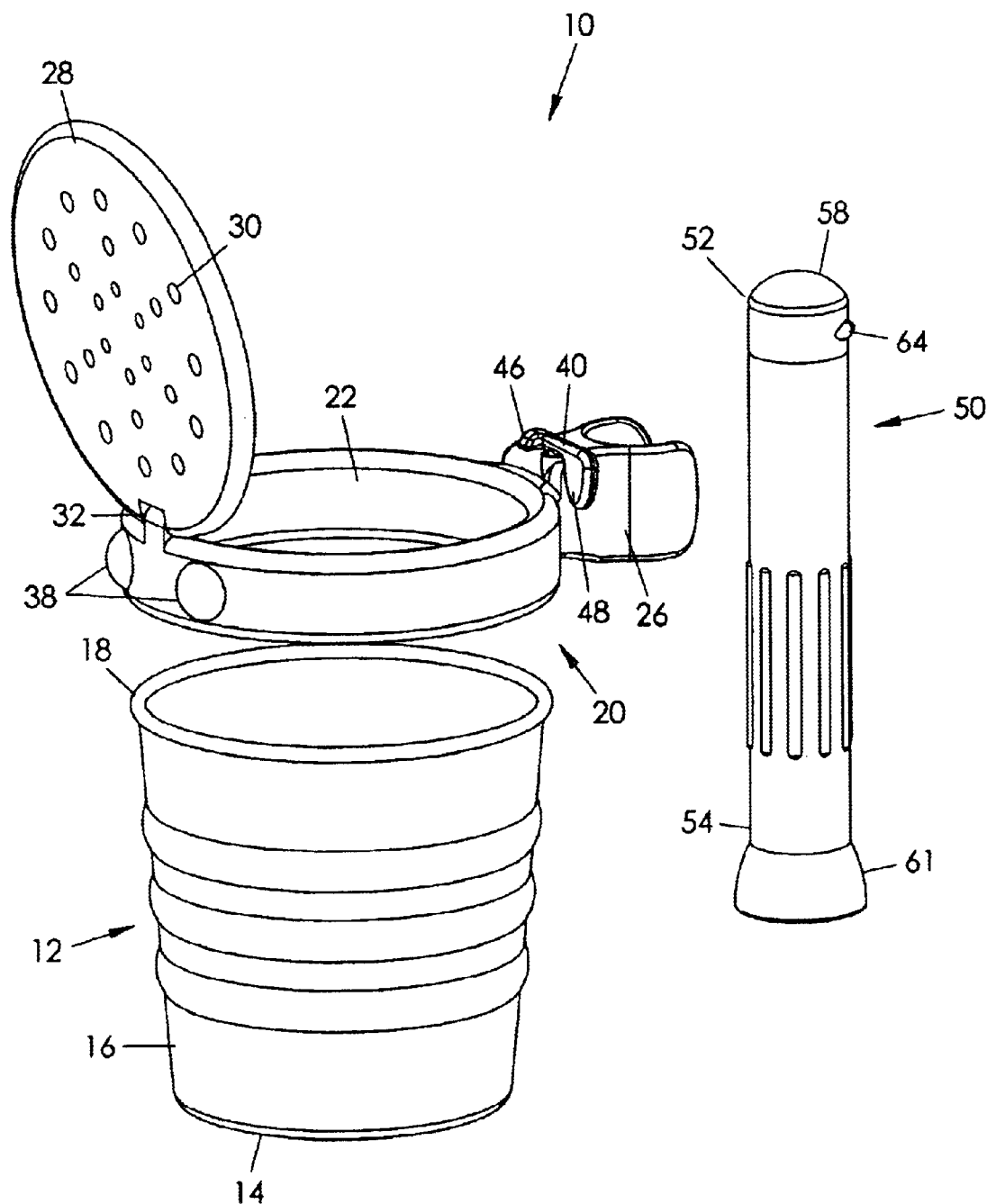
FIG. 2 is another perspective view of the apparatus as shown in FIG. 1 with the flashlight and rim assembly separated from the bait container.
Figure 3:
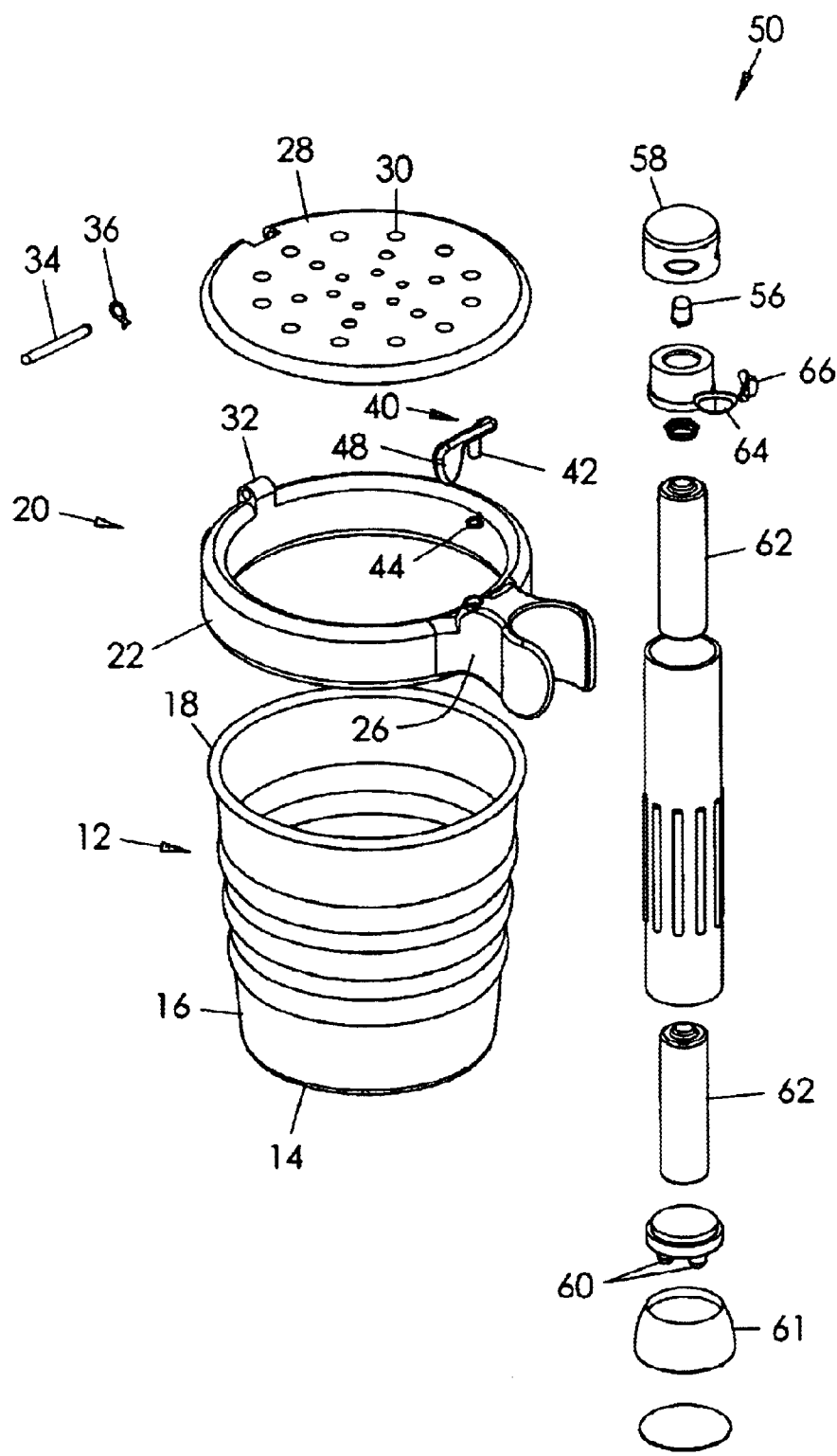
FIG. 3 is an exploded view of the apparatus shown in FIG. 2.

The rim assembly 20 further includes a lid 28 pivotally coupled to the rim body 22 with the pivot point of attachment being spaced apart from the clamp member 26. Preferably, the pivot point is adjacent a side opposite the clamp member 26 such that light from flashlight 50 is not blocked by the lid 28, as to be described below. The lid 28 is pivotally coupled to the rim body 22 with a hinge 32 having an axially movable pin 34 extending therethrough, or with another similar fastener. The lid 28 is movable between a closed configuration (FIG. 1) and an open configuration (FIG. 2). As best shown in FIG. 3, a torsion spring 36 is connected to the hinge pin 34 and interconnects the lid 28 and rim body 22. The lid 28 is biased toward its open configuration and, therefore, must be mechanically held in the closed configuration. The lid 28 defines a plurality of spaced apart holes 30 such that air may flow into and out from the bait container 12.

The lid 28 is held in the closed configuration (FIG. 1) or allowed to move to the open configuration (FIG. 2) by operation of a latch assembly. The latch assembly includes a lid lever 40 having a first end 42 coupled to an inner surface of the rim body 22 with a torsion spring 44 (FIG. 3). The lid lever 40 is laterally movable between first and second positions with the torsion spring 44 biasing the lever toward the first position. The lid lever 40 includes a ramp structure 46 adjacent the first end 42 (FIG. 2). The lid lever 40 is positioned such that the lid 28 contacts the ramp structure 46 when the lid 28 is moved from the open to the closed configuration. Such contact moves the lid lever 40 toward the second position (and biases the lid lever spring) and allows the lid 28 to rest underneath the ramp structure 46. Once the lid 28 is past the ramp structure 46, the hinge torsion spring 36 causes the lid lever 40 to return to its first position. The lid 28 is held beneath the ramp structure 46 of the lid lever 40. A second end 48 of the lid lever 40 acts as an activation button for a user. A user may press the second end 48 so as to cause the lid lever 40 to move toward its second position. Once moved, the lid 28 is freed from the ramp structure 46 and is moved by its torsion spring 44 to the open configuration (FIG. 2).

The rim assembly 20 includes a pair of nubs 38 positioned on an exterior surface thereof and spaced from the clamp member 26 (FIG. 2). Preferably, the nubs 38 are adjacent the hinge 32 so that the entire apparatus may be placed in a horizontal configuration while leaving the clamp member 26 on a top side orientation.

The lighted bait container apparatus 10 includes a novel flashlight 50 that may be strategically coupled to the bait container 12 and positioned to selectively illuminate the interior of the bait container 12 as well as a ground surface (FIG. 1). More particularly, the flashlight 50 includes a generally cylindrical housing having first 52 and second 54 ends and defining an interior space. A first light source 56 is positioned in the interior space. Preferably, the first light source 56 is a light emitting diode (LED) due to the durability and low power consumption of LED's although other light bulb constructions would also be suitable. Of course, the flashlight 50 may also include a first lens 58 and other conventional hardware (FIG. 3).

Further, the flashlight 50 includes a second light source 60 positioned in the interior space adjacent the second end 54 (FIG. 3). This light source may also be an LED for the same reasons discussed above, although it is understood that its power and output should be greater than that of the first light source 56 as it is intended to illuminate a larger ground surface. In addition, a focus ring 61 is rotatably coupled to the second end 54 of the flashlight housing, the focus ring 61 having reflective interior surfaces for selectively reflecting light from the second light source 60 in a narrow or wide beam, respectively, according to the ring's rotation by a user.

One or more batteries 62 are positioned within the interior space for selectively energizing the light sources (FIG. 3). First 64 and second 66 switches are also positioned on the flashlight housing and are electrically connected to the batteries 62 and light sources. The switches 64, 66 operate independently such that each light source may be turned on or off without regard to the other light source Or, both light sources may be energized simultaneously.

In use, the flashlight 50 may be snapped into the clamp member 26 and held in position such that the first light source 56 is generally positioned adjacent the open top of the bait container 12 (FIG. 1). In this position, the second light source 60 may be energized by a user depressing a respective switch 64 or 66 such that a ground surface is illuminated for searching for bait, e.g. worms. The focus ring 61 may be rotatably manipulated to focus the light in a narrow to wide pattern. The first light source 56 may be activated upon depression of the appropriate switch such that the latch assembly and container are mildly illuminated.

As bait is collected with one hand, the user may press the second end 48 of the lid lever 40 so as to release the lid 28 from beneath the ramp structure 46. Accordingly, the lid 28 is released with spring action to the open configuration (FIG. 2) and the collected bait may be deposited therein. With the bait deposited, the user may use the collecting hand to push the lid 28 back to its closed configuration (FIG. 1) where it is held beneath the ramp structure 46. If the bait container 12 becomes full, it may be frictionally detached from the rim body 22 and another container coupled thereto. This process may be essentially reversed for removing bait for use in fishing. The entire apparatus 10 may be laid on its side (e.g. in a horizontal orientation) by resting it on the nubs 38. The flashlight 50 remains in a upper and accessible position Of course, the flashlight may be removed from the clamp member 26 if it is desired to use it independently.

It is understood that while certain forms of this invention have been illustrated and described, it is not limited thereto except insofar as such limitations are included in the following claims and allowable functional equivalents thereof.

Having thus described the invention, what is claimed as new and desired to be secured by letters patent is as follows:

1. A lighted bait container apparatus, comprising:
   a container defining an open top;
   a flashlight having opposed first and second ends and defining an interior space;
   a first light source positioned in said interior space of said flashlight adjacent said first end;
   a clamp member coupled to said container for releasably holding said flashlight such that said first light source is positioned adjacent said open top;
   a rim assembly, including:
      a rim body removably coupled to an upper edge of said container at said open top, said clamp member being attached to said rim body;
      a lid pivotally coupled to said rim body and having a pivot point spaced apart from said clamp member, said lid being movable between open and closed configurations;
   wherein said rim assembly includes:
      a spring interconnecting said lid and said rim body for biasing said lid toward said open configuration; and
      a latch assembly mounted to said rim body that is movable between a first position for holding said lid in said closed configuration and a second position enabling said lid to move to said open configuration, said latch assembly being biased toward said first position.

2. The lighted bait container apparatus as in claim 1 wherein said rim body includes a pair of nubs positioned on an exterior surface thereof and displaced from said clamp member, whereby said container may be positioned in a generally horizontal configuration on a support surface.

3. The lighted bait container apparatus as in claim 1 wherein said lid defines a plurality of spaced apart holes for establishing an air flow therethrough.

4. The lighted bait container apparatus as in claim 1 wherein said container includes a closed bottom with a continuous side wall extending upwardly therefrom, said container adapted to hold a disposable bait cup therein.

5. The lighted bait container apparatus as in claim 1 wherein said flashlight includes a second light source positioned in said interior space adjacent said second end.

6. The lighted bait container apparatus as in claim 5 further comprising a battery positioned in said interior space of said flashlight and electrically connected to said first and second light sources.

7. The lighted bait container apparatus as in claim 6 further comprising:
   a first switch mounted to an exterior surface of said flashlight and electrically connected to said battery and to said first light source for selectively allowing current to flow from said battery to said first light source; and
   a second light switch mounted to an exterior surface of said flashlight and electrically connected to said battery for selectively allowing current to flow from said battery to said second light source.

8. The lighted bait container apparatus as in claim 5 wherein said first and second light sources are light emitting diodes.

9. The lighted bait container apparatus as in claim 5 wherein said flashlight includes a focus ring rotatably coupled to said second end thereof, said focus ring projecting light from said second light source between wide and narrow beams when said second light source is energized and said focus ring is rotated respectively.

10. A lighted bait container apparatus, comprising:
   a container having a closed bottom and a continuous side wall extending upwardly therefrom, an upper edge of said side wall defining an open top;
   a rim body removably coupled to said upper edge of said side wall;
   a flashlight having opposed first and second ends and defining an interior space;
   a first light source positioned in said interior space of said flashlight adjacent said first end;
   a second light source positioned in said interior space of said flashlight adjacent said second end;
   a battery power source positioned in said interior space of said flashlight and electrically connected to said first and second light sources;
   means for releasably coupling said flashlight to said rim body such that said first light source is positioned adjacent said open top; and
   a lid pivotally coupled to said rim body for movement between open and closed configurations, said lid having a pivot point displaced from said flashlight coupling means such that said first light source projects light through said open top when said first light source is energized and said lid is in said open configuration.

11. The lighted bait container apparatus as in claim 10 further comprising:
   a spring interconnecting said lid and said rim body for biasing said lid toward said open configuration;
   a latch assembly mounted to said rim body that is movable between a first position for holding said lid in said closed configuration and a second position enabling said lid to move to said open configuration; and
   means for biasing said latch assembly toward said first position.

12. The lighted bait container apparatus as in claims 10 wherein said rim body includes a pair of nubs positioned on an exterior surface thereof and displaced from said clamp member, whereby said container may be positioned in a generally horizontal configuration upon a support surface.

13. The lighted bait container apparatus as in claim 10 wherein said lid defines a plurality of spaced apart holes for enabling an air flow therethrough.

14. The lighted bait container apparatus as in claim 10 wherein said flashlight includes means for independently energizing said first and second light sources.

15. A lighted bait container apparatus, comprising:
   a generally cylindrical container having a closed bottom with a continuous side wall extending upwardly therefrom, said side wall having an upper edge defining an open top;
   a rim body removably coupled to said upper edge of said side wall;
   a clamp member fixedly attached to said rim body;
   a flashlight having opposed first and second ends and defining an interior space;
   a first light source positioned in said interior space of said flashlight adjacent said first end;
   a second light source positioned in said interior space of said flashlight adjacent said second end;
   a battery power source positioned in said interior space of said flashlight and electrically connected to said first and second light sources;
   wherein said clamp member is configured to releasably receive said flashlight in a friction-fit relationship;
   a lid pivotally coupled to said rim body for movement between open and closed configurations, said lid having a pivot point displaced from said clamp member such that said first light source projects through said open top when said first light source is energized and said lid is in said open configuration;
   a spring interconnecting said lid and said rim body for biasing said lid toward said open configuration;
   a latch assembly mounted to said rim that is movable between a first position for holding said lid in said closed configuration and a second position enabling said lid to move to said open configuration; and
   means for biasing said latch assembly toward said first position.

16. The lighted bait container apparatus as in claim 15 further comprising a pair of nubs positioned on an exterior surface of said rim assembly and displaced from said clamp member, whereby said container may be positioned in a generally horizontal configuration on a support surface.

17. The lighted bait container apparatus as in claim 16 wherein:
   said lid defines a plurality of spaced apart holes for enabling an air flow therethrough; and
   said flashlight includes a focus ring rotatably coupled to said second end thereof, an interior surface of said focus ring having reflective surfaces for selectively varying light emitted from said second light source between wide and narrow beams when said second light source is energized and said focus ring is rotated respectively.

* * * * *